US008100413B2

(12) United States Patent
Otaguro et al.

(10) Patent No.: US 8,100,413 B2
(45) Date of Patent: Jan. 24, 2012

(54) WORKPIECE VACUUM CHUCK HEAD

(75) Inventors: Tetsunori Otaguro, Tokyo (JP);
Takenori Hirakawa, Tokyo (JP)

(73) Assignee: Hirata Corporation, Tokyo (JP)

( * ) Notice: Subject to any disclaimer, the term of this patent is extended or adjusted under 35 U.S.C. 154(b) by 1024 days.

(21) Appl. No.: 11/990,009

(22) PCT Filed: Aug. 5, 2005

(86) PCT No.: PCT/JP2005/014392
§ 371 (c)(1),
(2), (4) Date: Feb. 5, 2008

(87) PCT Pub. No.: WO2007/017919
PCT Pub. Date: Feb. 15, 2007

(65) Prior Publication Data
US 2010/0194061 A1    Aug. 5, 2010

(51) Int. Cl.
B23B 31/30    (2006.01)
(52) U.S. Cl. .................. 279/3; 279/743; 294/64.1
(58) Field of Classification Search ........ 279/3; 29/743; 294/64.1
See application file for complete search history.

(56) References Cited

U.S. PATENT DOCUMENTS

| 3,957,263 | A | * | 5/1976 | Christl | 271/102 |
| 4,266,905 | A | * | 5/1981 | Birk et al. | 414/627 |
| 4,651,396 | A | * | 3/1987 | Kerlidou | 29/213.1 |
| 5,172,922 | A | * | 12/1992 | Kowaleski et al. | 279/3 |
| 5,257,805 | A | * | 11/1993 | Belec et al. | 271/2 |
| 5,427,363 | A | * | 6/1995 | Rink et al. | 269/21 |
| 6,394,520 | B1 | * | 5/2002 | Quick et al. | 294/64.1 |
| 6,425,565 | B1 | * | 7/2002 | Montague | 248/363 |
| 2002/0032960 | A1 | * | 3/2002 | Lee | 29/743 |
| 2003/0030293 | A1 | * | 2/2003 | Kashiwazaki et al. | 294/64.1 |

FOREIGN PATENT DOCUMENTS

| JP | 05-235594 | 9/1993 |
| JP | 50-14070 | 4/1995 |
| JP | 2002-103266 | 4/2002 |
| JP | 2002-307359 | 10/2002 |
| JP | 2003-165083 | 6/2003 |
| JP | 2005-179032 | 7/2005 |

* cited by examiner

*Primary Examiner* — Daniel Howell
*Assistant Examiner* — Paul M Janeski
(74) *Attorney, Agent, or Firm* — Bacon & Thomas, PLLC

(57) ABSTRACT

A workpiece vacuum chuck head, which serves to vacuum-chuck a light, minute workpiece and to release and place the vacuum-chucked workpiece on a workpiece placement surface, includes a base section, a workpiece vacuum chuck section, and a follower mechanism section for connecting together the base section and the workpiece vacuum chuck section. These sections form an integral structure. The base section has an attachment surface for attaching the workpiece vacuum chuck head to a head drive mechanism. The workpiece vacuum chuck section has a workpiece vacuum chuck surface and a negative-pressure chamber, which opens at the workpiece vacuum chuck surface via a suction hole. The follower mechanism section has a structure that is easily elastically deformable, and is appropriately deformed in a three-dimensional space so as to cause the workpiece vacuum chuck surface to follow an inclination of the workpiece placement surface.

8 Claims, 5 Drawing Sheets

F I G. 9
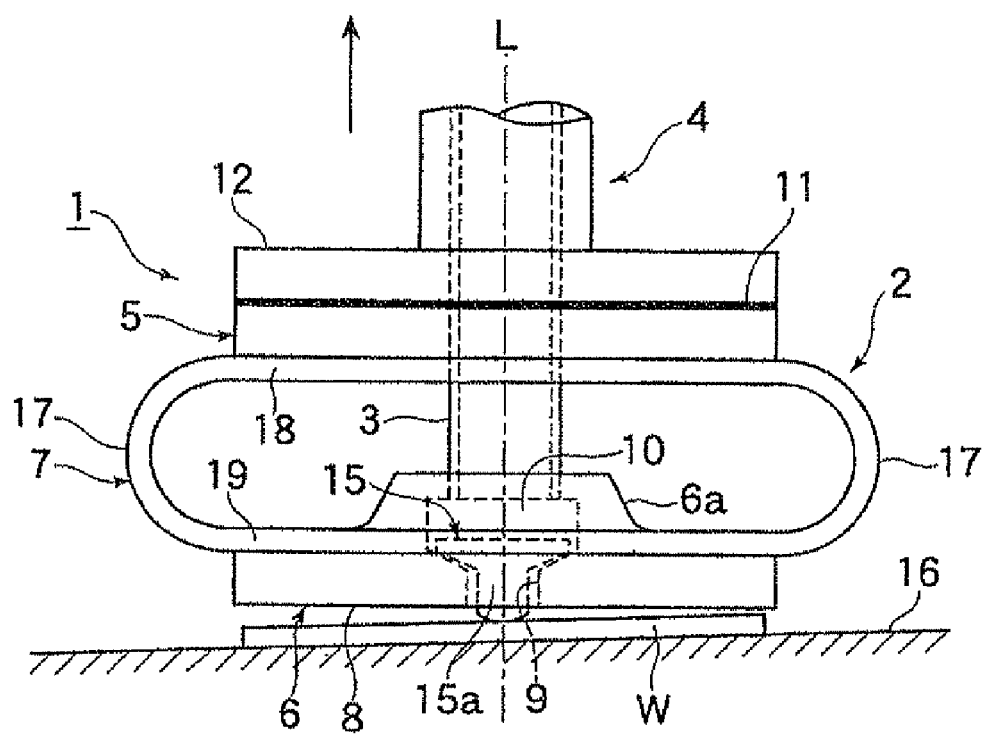

WORKPIECE VACUUM CHUCK HEAD

TECHNICAL FIELD

The present invention relates to a workplace vacuum chuck head, and more particularly to a workpiece vacuum chuck head used to vacuum-chuck a light, minute workplace and to release and place the vacuum-chucked workpiece on a workpiece placement surface, having a simple structure, and exhibiting excellent operability and reliability.

BACKGROUND ART

It is not easy to accurately and reliably vacuum-chuck a light, minute workplace having a size on the order of several hundreds of micrometers to several millimeters, to reliably release the vacuum-chucked workplace, and to accurately and reliably place the released workpiece on a workplace placement surface, for the following reasons. For a light, minute workpiece having a size on such an order, the influence of the gravity as well as an electrostatic force and interface energy cannot be ignored. For an ordinary method of merely applying and releasing a holding force or a vacuum-chucking force, it is not easy to place such a workplace on or remove the workpiece from a placement surface. Also, it is not easy to manufacture a vacuum chuck member in accordance with dimensions of such a workpiece and to accurately set the vacuum chuck member in accordance with the position and posture of the workpiece.

Conventionally employed devices for vacuum-chucking such a light, minute workpiece and releasing and placing the workpiece on, a placement surface include a workpiece vacuum chuck head and a workpiece vacuum chuck device disclosed in Japanese Patent Application Laid-Open (kokai) Nos. H5-235594 and 2003-165083, respectively.

The former device has a pusher provided within a negative-pressure chamber of the vacuum chuck head in order to reliably release an electronic component. Upon release of a negative pressure in the negative-pressure chamber, a pushing bottom end portion of the pusher projects from a suction hole so as to push a workpiece vacuum-chucked on a vacuum chuck surface, thereby helping the workpiece to be released from the vacuum chuck surface. However, this device does not have a follower mechanism for causing the vacuum chuck surface to follow the workpiece placement surface.

The latter device has a coil spring (first buffer mechanism) disposed between a vacuum chuck nozzle body and a holder section, in which the vacuum chuck nozzle is accommodated, and a thin-walled portion (second buffer mechanism) provided inside the vacuum chuck nozzle body in order to reduce an impact load associated with pushing of the vacuum chuck nozzle against a thin, minute workpiece, such as an electronic component, for vacuum-chucking the workpiece, and an impact load associated with attachment of the vacuum-chucked workpiece onto a substrate, thereby preventing cracking or chipping-off of the workpiece. The thin-walled portion (second buffer mechanism) is a particularly thin-walled structure formed between a nozzle tip, which is located at the front end of the vacuum chuck nozzle body, and a nozzle intermediate-portion, which is located at the root of the vacuum chuck nozzle body. When the nozzle chip is pushed against a workpiece for vacuum-chucking the workpiece and for attaching the vacuum-chucked workpiece to a substrate, first, the thin-walled portion (second buffer mechanism) is deformed; then, the coil spring (first buffer mechanism) is compressed according to the magnitude of the pushing force. This can mitigate or prevent the above-mentioned occurrence of an impact load and cracking or chipping-off of the workpiece.

However, the latter device does not have means for reliably releasing a vacuum-chucked workpiece from the nozzle tip. Also, although the thin-walled portion (second buffer mechanism) can be deformed along the axial direction of the nozzle tip in order to reduce an impact load associated with pushing of the vacuum chuck nozzle against the workpiece and to prevent cracking or chipping-off of the workpiece, a workplace chuck surface formed on the end face of the nozzle tip is small in area, implying that at a design stage the workplace chuck surface is not expected to exhibit a function of following an inclination of a workplace placement surface.

Japanese Utility Model Publication (kokoku) No. S50-14070 discloses a workpiece vacuum chuck device having the following function for causing a workpiece vacuum chuck surface to follow an inclination of a workplace placement surface. However, this device is not intended to vacuum-chuck and attach a light, minute workpiece having a size on the order of several hundreds of micrometers to several millimeters and thus is not devised to handle such workplaces.

Patent Document 1: Japanese Patent Application Laid-Open (kokai) No. H5-235594
Patent Document 2: Japanese Patent Application Laid-Open (kokai) No. 2003-165083
Patent Document 3: Japanese Utility Model Publication (kokoku) No. S50-14070

DISCLOSURE OF THE INVENTION

Problems to be Solved by the Invention

An object of the present invention is to solve the above-mentioned problems in the conventional workpiece vacuum chuck head and the conventional workpiece vacuum chuck device and to provide a workpiece vacuum chuck head used to vacuum-chuck a light, minute workpiece and to release and place the vacuum-chucked workpiece on a workpiece placement surface; capable of, while following the inclination of the workpiece placement surface, accurately and reliably vacuum-chucking the workpiece, reliably releasing the vacuum-chucked workpiece, and accurately and reliably placing the released workpiece on the workpiece placement surface; not damaging the workpiece; having a simple structure; and exhibiting excellent operability and reliability.

Means for Solving the Problems

The above-mentioned problems are solved by the following inventions claimed in the appended claims. Specifically, an invention described in claim 1 provides a workpiece vacuum chuck head used to vacuum-chuck a light, minute workpiece and to release and place the vacuum-chucked workpiece on a workpiece placement surface, comprising a base section; a workpiece vacuum chuck section; and a follower mechanism section for connecting together the base section and the workpiece vacuum chuck section. In the workpiece vacuum chuck head, the base section, the workpiece vacuum chuck section, and the follower mechanism section are integrated to form an integral structure; the base section has an attachment surface for attaching the workpiece vacuum chuck head to a head drive mechanism; the workpiece vacuum chuck section has a workpiece vacuum chuck surface for vacuum-chucking the workpiece, and a negative-pressure chamber provided within the workpiece vacuum chuck section and opening at the workpiece vacuum chuck surface via a suction hole; and the follower mechanism section has a structure that is easily elastically deformable, and is appropriately deformed in a three-dimensional space so as to cause the workpiece vacuum chuck surface to follow an inclination of the workpiece placement surface.

Since the workpiece vacuum chuck head is configured as mentioned above, the workpiece vacuum chuck head can accurately and reliably vacuum-chuck a workpiece while following the inclination of the workpiece placement surface, and can accurately and reliably place the workpiece on the workpiece placement surface. Thus, the workpiece can be accurately and reliably placed on and removed from the workpiece placement surface. Furthermore, since an excessive stress is not applied to the workpiece, the workpiece is not damaged.

Furthermore, the workpiece vacuum chuck head has an integral structure and thus is structurally simplified. Also, the working of the follower mechanism section eliminates need to rotatively operate the workpiece vacuum chuck head, so that the workpiece vacuum chuck head is operated linearly and simply, thereby exhibiting excellent operability and reliability.

According to a preferred embodiment, a workpiece pusher is accommodated in the negative-pressure chamber of the workpiece vacuum chuck head, and the workpiece pusher has a pin portion which is inserted into the suction hole and which projects beyond and retracts behind the workpiece vacuum chuck surface.

According to the above configuration, for example, when, for placement of a vacuum-chucked workpiece on the workpiece placement surface, a negative pressure of the negative-pressure chamber is released, the gravity or a positive pressure, which is switched from the negative pressure upon release of the negative pressure, causes the pin portion of the workpiece pusher to project beyond the workpiece vacuum chuck surface and thereby to push the workpiece. Thus, the workpiece can be reliably released from the workpiece vacuum chuck surface. Therefore, while following the inclination of the workpiece placement surface and reliably releasing the vacuum-chucked workpiece by means of the pin portion pushing the workpiece, the workpiece vacuum chuck head can accurately and reliably place the workpiece on the workpiece placement surface, thereby avoiding positional misalignment of the workpiece. Also, in vacuum-chucking of the workpiece, the workpiece vacuum chuck head vacuum-chucks the workpiece while following the inclination of the workpiece placement surface with the pin portion pushing the workpiece; thus, the workpiece vacuum chuck head can accurately and reliably vacuum-chuck the workpiece onto the workpiece vacuum chuck surface, thereby avoiding positional misalignment of the workpiece.

According to another preferred embodiment, the structure of the follower mechanism section of the workpiece vacuum chuck head that is easily elastically deformable has a plurality of curved spring legs, and the plurality of curved spring legs connect the base section and the workpiece vacuum chuck section at a plurality of corresponding positions and allow the workpiece vacuum chuck surface to be uniformly displaced upon subjection to an external force of any direction that acts on the workpiece vacuum chuck surface.

With this, the structure of the follower mechanism section that is easily elastically deformable can be implemented through employment of a very simple configuration. Also, the configuration simplifies control of the follower mechanism section.

According to a further preferred embodiment, the base section and the workpiece vacuum chuck section of the workpiece vacuum chuck head each have a shape of a rectangular quadrilateral as viewed in plane, and the plurality of curved spring legs connect four corner portions of the base section and corresponding four corner portions of the workpiece vacuum chuck section, respectively.

With this, the structure of the follower mechanism section that is easily elastically deformable can be implemented through employment of a simpler configuration.

Effects of the Invention

As mentioned above, the workpiece vacuum chuck head of the present invention can accurately and reliably vacuum-chuck a workpiece while following the inclination of the workpiece placement surface, and can accurately and reliably place the workpiece on the workpiece placement surface. Thus, the workpiece can be accurately and reliably placed on and removed from the workpiece placement surface. Also, since an excessive stress is not applied to the workpiece, the workpiece is not damaged. Furthermore, the workpiece vacuum chuck head has an integral structure and thus is structurally simplified. Also, the working of the follower mechanism section simplifies the operation of the workpiece vacuum chuck head, so that the workpiece vacuum chuck head exhibits excellent operability and reliability.

In the case where the workpiece pusher is accommodated in the negative-pressure chamber of the workpiece vacuum chuck head, and the workpiece pusher has the pin portion which is inserted into the suction hole and which projects beyond and retracts behind the workpiece vacuum chuck surface, the following advantageous effects can be attained. When the vacuum-chucked workpiece is placed on the workpiece placement surface, the workpiece vacuum chuck head follows the inclination of the workpiece placement surface, and reliably releases the vacuum-chucked workpiece by means of the pin portion pushing the workpiece. Therefore, the workpiece vacuum chuck head can accurately and reliably place the workpiece on the workpiece placement surface, thereby avoiding positional misalignment of the workpiece. Also, when the workpiece is vacuum-chucked, the workpiece vacuum chuck head follows the inclination of the workpiece placement surface, and the pin portion pushes the workpiece. Therefore, the workpiece vacuum chuck head can accurately and reliably vacuum-chuck the workpiece onto the workpiece vacuum chuck surface, thereby avoiding positional misalignment of the workpiece.

In the case where the structure of the follower mechanism section of the workpiece vacuum chuck head that is easily elastically deformable has the plurality of curved spring legs, and the plurality of curved spring legs connect the base section and the workpiece vacuum chuck section at a plurality of corresponding positions and allow the workpiece vacuum chuck surface to be uniformly displaced upon subjection to an external force of any direction that acts on the workpiece vacuum chuck surface, the structure of the follower mechanism section that is easily elastically deformable can be implemented through employment of a very simple configuration.

BRIEF DESCRIPTION OF THE DRAWINGS

FIG. 9 is a third view for explaining the method of vacuum-chucking a workpiece and releasing and placing the vacuum-chucked workpiece on a workpiece placement surface by use of the workpiece vacuum chuck head of the embodiment.

DESCRIPTION OF REFERENCE NUMERALS

Figure 1:
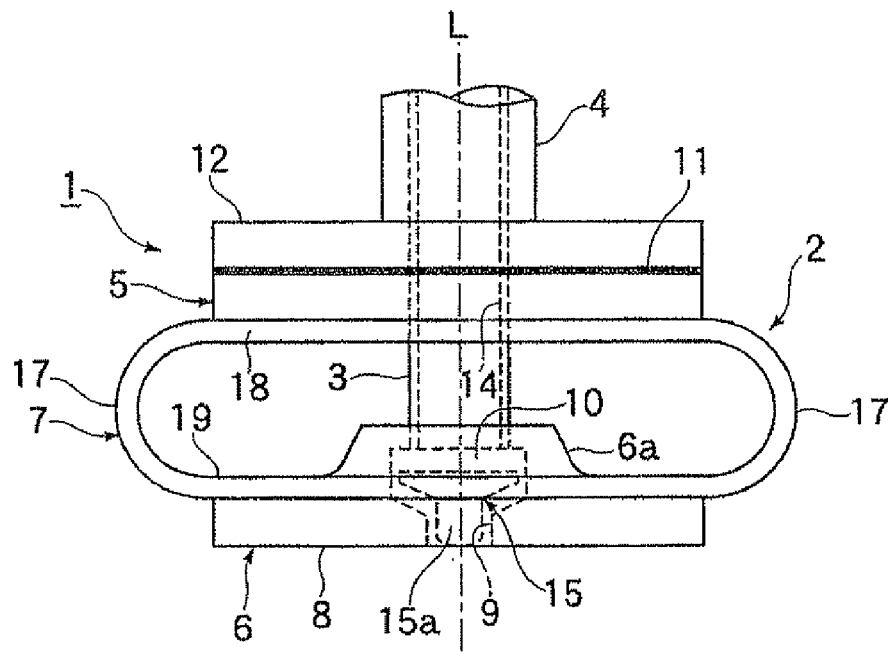
FIG. 1 is a front view of a workpiece vacuum chuck head of an embodiment of the present invention.
Figure 2:
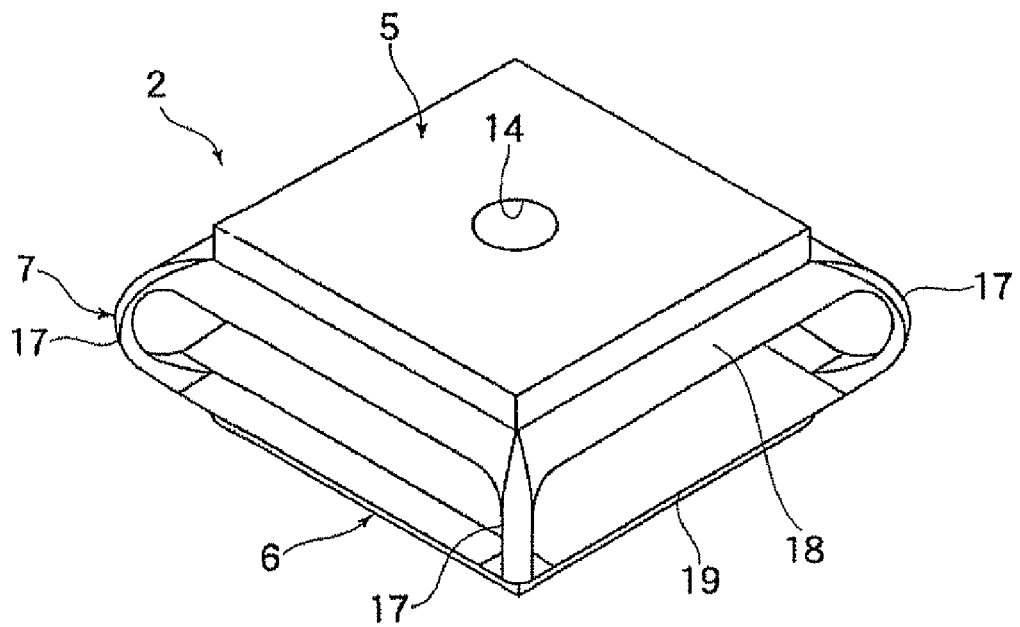
FIG. 2 is a perspective view of a workpiece vacuum chuck head body of the workpiece vacuum chuck head of the embodiment as viewed from an obliquely upper position.
Figure 3:
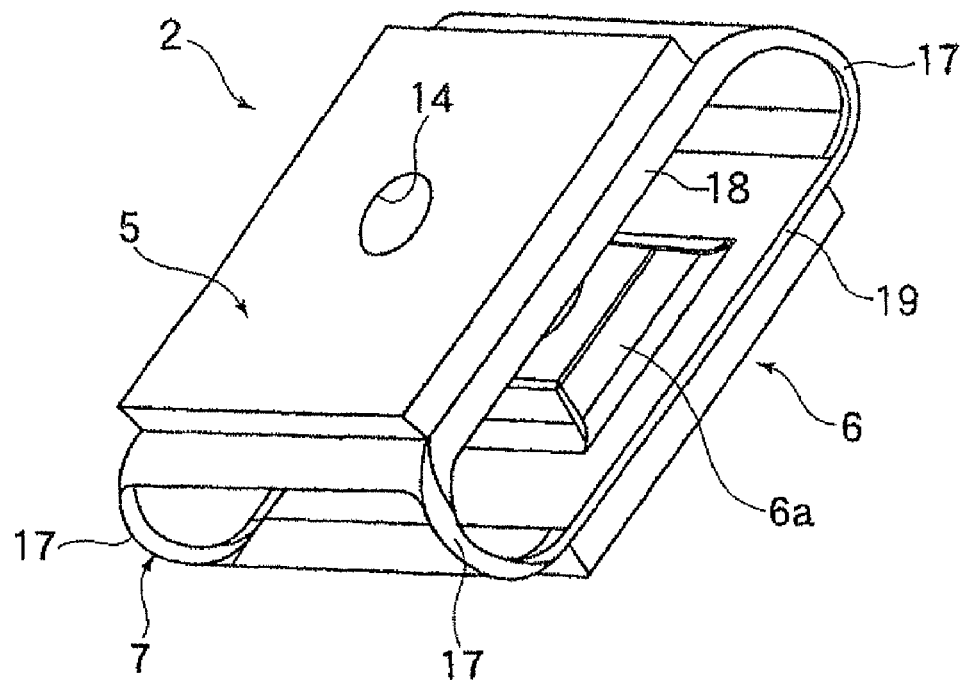
FIG. 3 is a perspective view of the workpiece vacuum chuck head body of the workpiece vacuum chuck head of the embodiment as viewed from another obliquely upper position.
Figure 4:
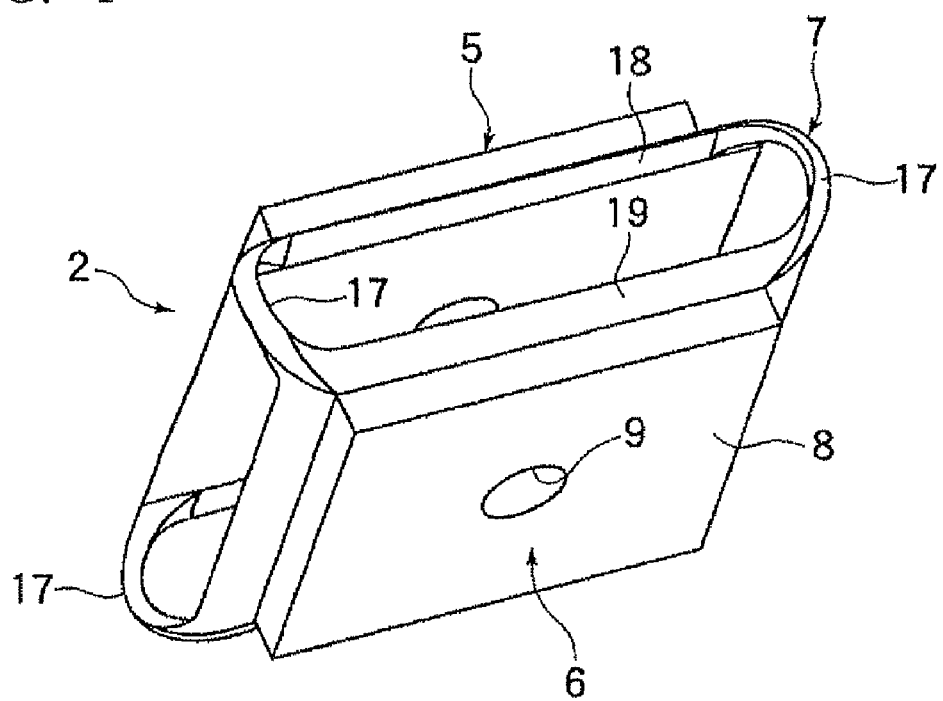
FIG. 4 is a perspective view of the workpiece vacuum chuck head body of the workpiece vacuum chuck head of the embodiment as viewed from an obliquely lower position.
Figure 5:
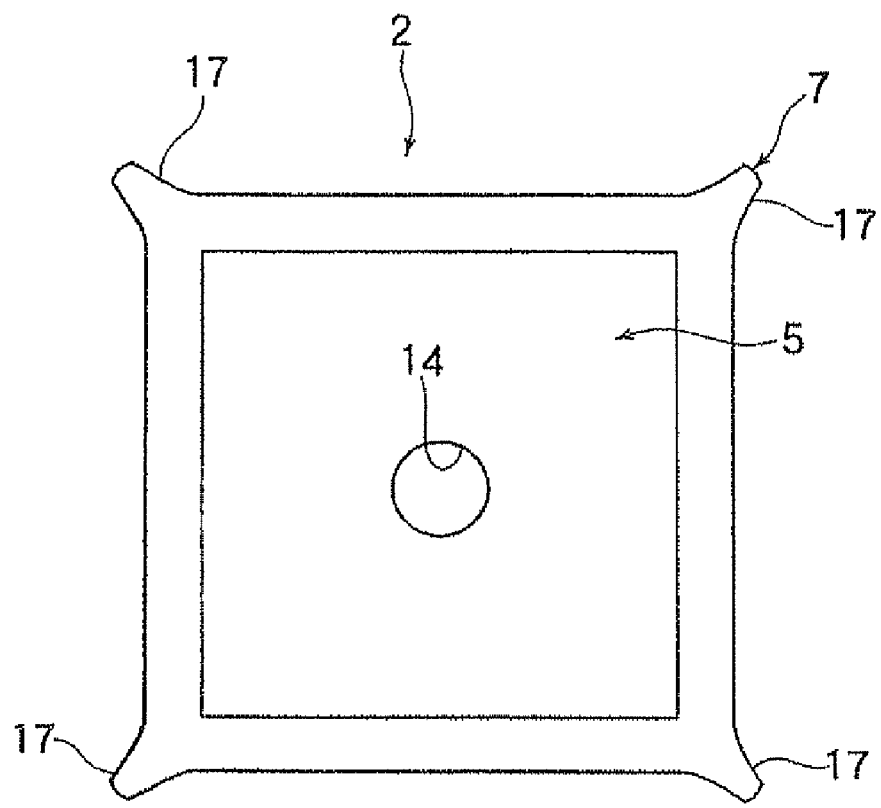
FIG. 5 is a plan view of the workpiece vacuum chuck head body of the workpiece vacuum chuck head of the embodiment.
Figure 6:
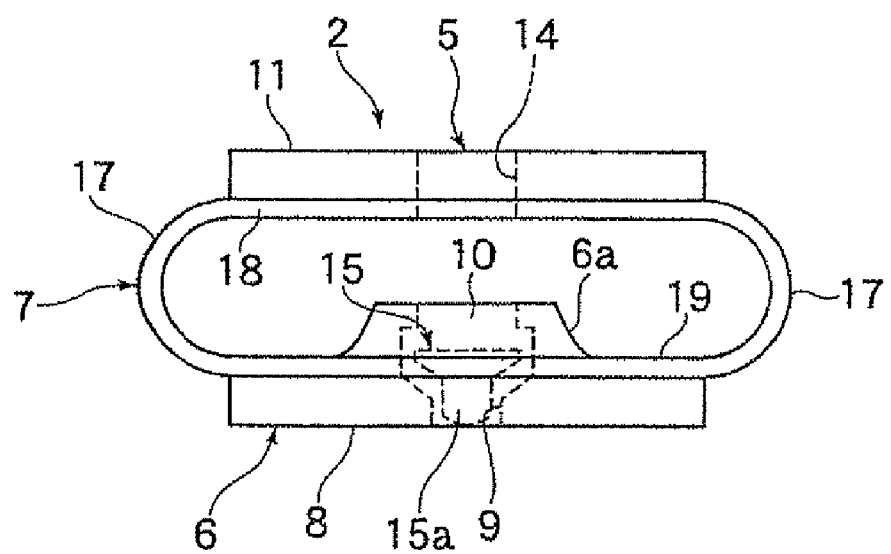
FIG. 6 is a side view of the workpiece vacuum chuck head body of the workpiece vacuum chuck head of the embodiment.

1: workpiece vacuum chuck head
2: workpiece vacuum chuck head body
3: communication pipe
4: head section
5: base section
6: workpiece vacuum chuck section
6*a*: bulge portion
7: follower mechanism section
8: workpiece vacuum chuck surface
9: suction hole
10: negative-pressure chamber
11: attachment surface
12: attachment plate
13: bolt
14: hole
15: workpiece pusher
15*a*: pin portion
16: workpiece placement surface
17: spring leg
18: upper plate member
19: lower plate member
L: axis
L': perpendicular
W: workpiece

BEST MODE FOR CARRYING OUT THE INVENTION

A workpiece vacuum chuck head used to vacuum-chuck a light, minute workpiece and to release and place the vacuum-chucked workpiece on a workpiece placement surface comprises a base section; a workpiece vacuum chuck section; and a follower mechanism section for connecting together the base section and the workpiece vacuum chuck section. The base section, the workplace vacuum chuck section, and the follower mechanism section are integrated to form an integral structure. The base section has an attachment surface for attaching the workplace vacuum chuck head to a head drive mechanism; and the workpiece vacuum chuck section has a workpiece vacuum chuck surface for vacuum-chucking the workplace, and a negative-pressure chamber provided within the workpiece vacuum chuck section and opening at the workpiece vacuum chuck surface via a suction hole. The follower mechanism section has a structure that is easily elastically deformable, and is appropriately deformed in a three-dimensional space so as to cause the workpiece vacuum chuck surface to follow an inclination of the workpiece placement surface. A workpiece pusher is accommodated in the negative-pressure chamber, and the workpiece pusher has a pin portion which is inserted into the suction hole and which projects beyond and retracts behind the workpiece vacuum chuck surface.

The structure of the follower mechanism section that is easily elastically deformable has a plurality of curved spring legs. The plurality of curved spring legs connect four corner portions of the base section having the shape of a rectangular quadrilateral as viewed in plane and corresponding four corner portions of the workpiece vacuum chuck section having the shape of a rectangular quadrilateral as viewed in plane. The plurality of curved spring legs allow the workpiece vacuum chuck surface to be uniformly displaced upon subjection to an external force of any direction that acts on the workpiece vacuum chuck surface.

EMBODIMENT

Next, an embodiment of the present invention will be described.

A workpiece vacuum chuck head of the present embodiment is used to vacuum-chuck a light, minute workpiece, such as an electronic component, and to release and place the vacuum-chucked workpiece on a workpiece placement surface, such as a substrate surface. The workpiece vacuum chuck head is roughly configured such that, as shown in FIG. 1, a communication pipe 3 extending to a vacuum source is connected to a workpiece vacuum chuck head body 2 shown in FIGS. 2 to 6. In actual use, a workpiece vacuum chuck head 1 of the present embodiment is attached to a head section 4 located at the distal end of a robot hand. However, the present invention is not limited thereto. The workpiece vacuum chuck head 1 may be attached to a traveling member, which is movable in X-, Y-, and Z-directions, of an electronic component assembly apparatus or the like.

The workpiece vacuum chuck head body 2 is configured as follows.

The workpiece vacuum chuck head body 2 includes a base section 5, a workpiece vacuum chuck section 6, and a follower mechanism section 7, which connects together the base section 5 and the workpiece vacuum chuck section 6. The base section 5, the workpiece vacuum chuck section 6, and the follower mechanism section 7 are formed from a spring-tempered metal material such that they form an integral structure. The workpiece vacuum chuck head body 2 has a small size corresponding to the size of a workpiece W (see FIG. 7). Each of the base section 5 and the workpiece vacuum chuck section 6 is formed of a plate-like block having the shape of a rectangular quadrilateral as viewed in plane. The workpiece vacuum chuck section 6 has a bulge portion 6*a* located at its central portion and adapted to accommodate a negative-pressure chamber 10, which will be described later.

The base section 5 has an attachment surface 11 for attaching the workpiece vacuum chuck head 2 to the head section 4 located at the distal end of the robot hand. As shown in FIG. 1, an attachment plate 12 of the head section 4 is attached to the attachment surface 11 by bonding or by tightening screws.

A hole 14 through which the communication pipe 3 extends opens at a central portion of the attachment surface 11.

The workpiece vacuum chuck section 6 has a workpiece vacuum chuck surface 8 for vacuum chucking the workpiece W, and the negative-pressure chamber 10. The negative-pressure chamber 10 is provided inside the central bulge portion 6a of the workpiece vacuum chuck section 6 and opens at the workpiece vacuum chuck surface 8 via a suction hole 9. One end of the communication pipe 3, which extends through the hole 14 formed through the base section 5 and the follower mechanism section 7, is connected to the negative-pressure chamber 10. The negative-pressure chamber 10 communicates with an unillustrated negative-pressure source via the communication pipe 3. The communication pipe 3 extends through an internal space of the robot hand and is connected to the negative-pressure source.

The negative-pressure chamber 10 accommodates a workpiece pusher 15. A lower portion of the workpiece pusher 15 is formed into a pin portion 15a. The pin portion 15a is inserted into the suction hole 9 and can project beyond and retract behind the workpiece vacuum chuck surface 8. For example, when a negative pressure of the negative-pressure chamber 10 is released, the gravity or a positive pressure, which is switched from the negative pressure upon release of the negative pressure, causes the workpiece pusher 15 to drop, so that the pin portion 15a projects beyond the workpiece vacuum chuck surface 8. The projecting pin portion 15a pushes the workpiece W, which has been vacuum-chucked on the workpiece vacuum chuck surface 8, thereby reliably releasing the workpiece W from the workpiece vacuum chuck surface 8 (see FIG. 9).

Figure 7:
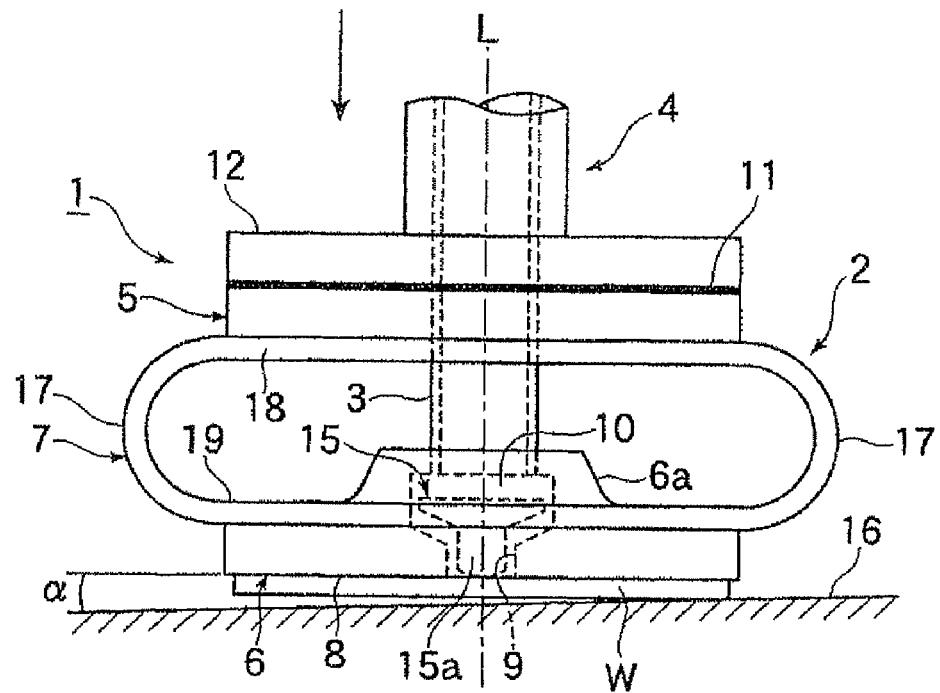
FIG. 7 is a first view for explaining a method of vacuum-chucking a workpiece and releasing and placing the vacuum-chucked workpiece on a workpiece placement surface by use of the workpiece vacuum chuck head of the embodiment.

The follower mechanism section 7 has a structure that is easily elastically deformable, and is appropriately deformed in a three-dimensional space so as to cause the workpiece vacuum chuck surface 8 to follow an inclination of a workpiece placement surface 16 (see FIG. 7). The structure of the follower mechanism section 7 that is easily elastically deformable has a plurality of (in the present embodiment, four) curved spring legs 17. The plurality of curved spring legs 17 connect four corner portions of the base section 5 having the shape of a rectangular quadrilateral as viewed in plane and corresponding four corner portions of the workpiece vacuum chuck section 6 having the shape of a rectangular quadrilateral as viewed in plane. The plurality of curved spring legs 17 allow the workpiece vacuum chuck surface 8 to be uniformly displaced upon subjection to an external force of any direction that acts on the workpiece vacuum chuck surface 8.

In actuality, the plurality of curved spring legs 17 connect four corner portions of an upper plate member 18 having the shape of a rectangular quadrilateral as viewed in plane and corresponding four corner portions of a lower plate member 19 having the shape of a rectangular quadrilateral as viewed in plane, the upper and lower plate members 18 and 19 partially constituting the follower mechanism section 7. The upper plate member 18 and the lower plate member 19 are formed integral with the base section 5 and the workpiece vacuum chuck section 6, respectively, to form respective integral structures; as a result, four corner portions of the base section 5 and corresponding four corner portions of the workpiece vacuum chuck portion 6 are connected together. The central bulge portion 6a of the workpiece vacuum chuck section 6 extends through a central portion of the lower plate member 19 and projects inwardly. The inwardly projecting portion forms an upper wall of the negative-pressure chamber 10 as viewed in FIG. 1. In a functional view, the inwardly projecting portion should not be considered to belong to the lower plate member 19 (see FIGS. 1, 3, and 6).

Figure 8:
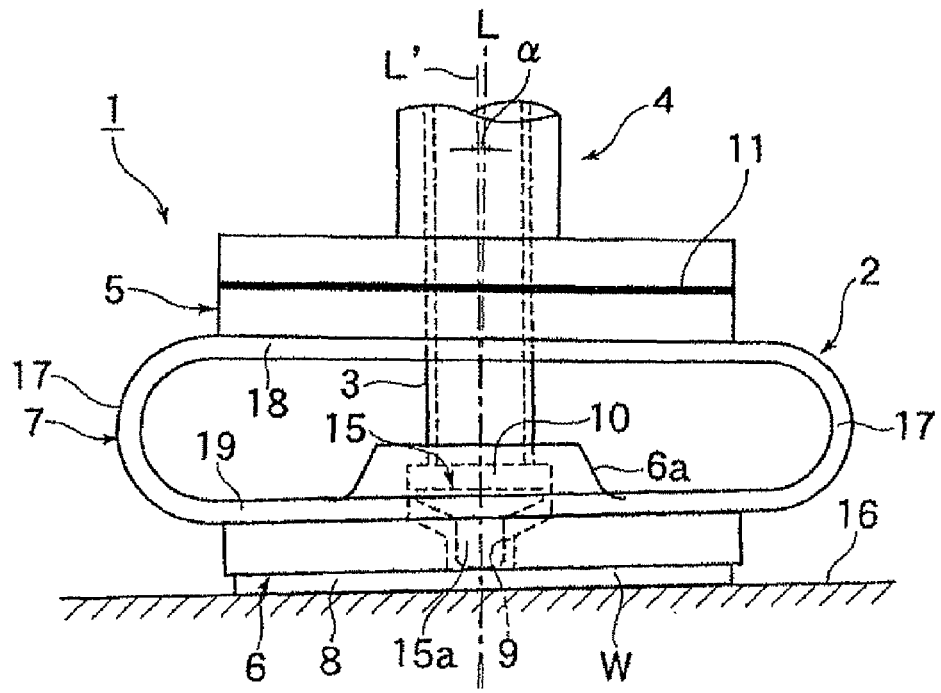
FIG. 8 is a second view for explaining the method of vacuum-chucking a workpiece and releasing and placing the vacuum-chucked workpiece on a workpiece placement surface by use of the workpiece vacuum chuck head of the embodiment.

Next will be described a method of vacuum-chucking the workpiece W by use of the workpiece vacuum chuck head 1 of the present embodiment and a method of releasing and placing the vacuum-chucked workpiece W on the workpiece placement surface 16 by use of the workpiece vacuum chuck head 1. First, the method of releasing and placing the vacuum-chucked workpiece W on the workpiece placement surface 16 will be described with reference to FIGS. 7 to 9. The method of vacuum-chucking the workpiece W is the reverse procedure of the releasing and placing method.

First, while vacuum-chucking the workpiece W on the workpiece vacuum chuck surface 8 of the workpiece vacuum chuck section 6, the workpiece vacuum chuck head 1 lowers toward the workpiece placement surface 16. As shown in FIG. 7, the workpiece placement surface 16 is inclined by an angle $\alpha$ with respect to the horizontal. After one end (in FIG. 7, the right end) of the workpiece W comes into contact with the workpiece placement surface 16, the workpiece vacuum chuck head 1 continues lowering. As a result, the workpiece vacuum chuck section 6 and the workpiece W rotates about the one end of the workpiece W, which one end serves as a fulcrum, so as to become parallel with the workpiece placement surface 16, whereby their posture is inclined by the angle $\alpha$. Since the posture of the head section 4 located at the distal end of the robot hand remains unchanged, in order to enable the above-mentioned inclination of the workpiece vacuum chuck section 6 and the workpiece W, two right-hand spring legs 17 in FIG. 7 of the follower mechanism section 7 are forced to increase in curvature so as to reduce the distance between the right end of the upper plate member 18 and the right end of the lower plate member 19 (see FIGS. 7 and 8).

In FIGS. 1 and 7 to 9, letter L denotes the center axis of the workpiece vacuum chuck head 1. The center axis L passes through the centers of the negative-pressure chamber 10 and the hole 14. When the workpiece vacuum chuck head 1 is in a natural state, the center axis L coincides with a perpendicular L' (see FIG. 8) passing through the center of the workpiece vacuum chuck surface 8 and standing on the workpiece vacuum chuck surface 8. When the workpiece vacuum chuck section 6 and the workpiece W are inclined by the angle $\alpha$ as mentioned above, the center axis L and the perpendicular L' form the angle $\alpha$ with each other.

Next, in this state, when a negative pressure of the negative-pressure chamber 10 is released, vacuum-chucking of the workpiece W on the workpiece vacuum chuck surface 8 is released, so that the workpiece W can be released from the workpiece vacuum chuck surface 8. However, because of the influence of a force other than the gravity, such as an electrostatic force or an interfacial force, the workpiece W is not easily released from the workpiece vacuum chuck surface 8. Therefore, the workpiece vacuum chuck head 1 is slightly raised. By this procedure, the gravity or a positive pressure, which is switched from the negative pressure upon release of the negative pressure, causes the workpiece pusher 15 within the negative-pressure chamber 10 to drop; as a result, the pin portion 15a of the workpiece pusher 15 projects beyond the workpiece vacuum chuck surface 8. The projecting pin portion 15a pushes the workpiece W, which has been vacuum-chucked on the workpiece vacuum chuck surface 8, thereby reliably releasing the workpiece W from the workpiece vacuum chuck surface 8 (see FIG. 9).

Subsequently, as the workpiece vacuum chuck head 1 continues rising, the pin portion 15a continues pushing the workpiece W for a while and is then completely separated from the workpiece W. Thus, the workpiece vacuum chuck head 1 enters a free state of not vacuum-chucking the workpiece and can move away from the workpiece placement surface 16. The "for a while" time when the pin portion 15a continues pushing the workpiece W is a length of time until the pin portion 15a projects beyond the workpiece vacuum chuck surface 8 by the overall projectable length of the pin portion 15a. During the length of time, the pin portion 15a continues pushing the workpiece W. Therefore, when the workpiece vacuum chuck head 1 moves away from the workpiece placement surface 16, the workpiece W which has been properly placed on the workpiece placement surface 16 does not move from the proper position.

When the workpiece vacuum chuck head 1 is to vacuum-chuck the workpiece W placed on the workpiece placement surface 16, the above-described procedure may be reversely followed.

In this case, the workpiece vacuum chuck head 1 approaches the workpiece W in a state in which the pin portion 15a of the workpiece pusher 15 of the workpiece vacuum chuck head 1 pushes the workpiece W (see FIG. 9). Then, the follower mechanism section 7 allows the workpiece vacuum chuck head 1 to continue inclining until the workpiece vacuum chuck head 1 assumes the same inclination as that of the workpiece W, whereby the workpiece vacuum chuck head 1 comes into contact with the workpiece W. Through application of a negative pressure to the workpiece vacuum chuck head 1, the workpiece vacuum chuck head 1 can vacuum-chuck the workpiece W (see FIG. 8). Therefore, when the workpiece vacuum chuck head 1 vacuum-chucks the workpiece W, the workpiece W does not move from its original position.

Since the workpiece vacuum chuck head 1 of the present embodiment is configured as described above, the workpiece vacuum chuck head 1 can yield the following effects.

While following the inclination of the workpiece placement surface 16, the workpiece vacuum chuck head 1 can accurately and reliably vacuum-chuck the workpiece W and can accurately and reliably place the workpiece W on the workpiece placement surface 16. Thus, the workpiece W can be accurately and reliably placed on and removed from the workpiece placement surface 16. Furthermore, since, through employment of a plurality of the curved spring legs 17, the follower mechanism section 7 has a structure that is easily elastically deformable, and is appropriately deformed in a three-dimensional space, whereby an excessive stress is not applied to the workpiece W. Thus, the workpiece W is not damaged.

Also, the workpiece vacuum chuck head 1 has an integral structure and thus is structurally simplified. The working of the follower mechanism section 7 eliminates need to rotatively operate the workpiece vacuum chuck head 1, so that the workpiece vacuum chuck head 1 is operated linearly and simply, thereby exhibiting excellent operability and reliability.

Also, the workpiece pusher 15 is accommodated in the negative-pressure chamber 10, and the workpiece pusher 15 has a pin portion 15a which is inserted into the suction hole 9 and which can project beyond and retract behind the workpiece vacuum chuck surface 8. Thus, for example, when, for placement of the vacuum-chucked workplace W on the workpiece placement surface 16, a negative pressure of the negative-pressure chamber is released, the gravity causes the pin portion 15a of the workplace pusher 15 to project beyond the workpiece vacuum chuck surface 8 and thereby to push the workplace W. Thus, the workpiece W can be reliably released from the workpiece vacuum chuck surface 8. Therefore, while following the inclination of the workpiece placement surface 16 and reliably releasing the vacuum-chucked workpiece W by means of the pin portion 15a pushing the workpiece W, the workpiece vacuum chuck head 1 can accurately and reliably place the workpiece W on the workpiece placement surface 16, thereby avoiding positional misalignment of the workpiece W. Also, in vacuum-chucking of the workplace W, the workplace vacuum chuck head 1 vacuum-chucks the workpiece W while following the inclination of the workpiece placement surface 16 with the pin portion 15a pushing the workpiece W; thus, the workpiece vacuum chuck head 1 can accurately and reliably vacuum-chuck the workpiece W onto the workpiece vacuum chuck surface 8, thereby avoiding positional misalignment of the workpiece W.

Furthermore, the structure of the follower mechanism section 7 that is easily elastically deformable has a plurality of the curved spring legs 17. The plurality of curved spring legs 17 connect four corner portions of the base section 5 having the shape of a rectangular quadrilateral as viewed in plane and corresponding four corner portions of the workpiece vacuum chuck section 6 having the shape of a rectangular quadrilateral as viewed in plane. The plurality of curved spring legs 17 allow the workpiece vacuum chuck surface 8 to be uniformly displaced upon subjection to an external force of any direction that acts on the workpiece vacuum chuck surface 8. Therefore, the structure of the follower mechanism section 7 that is easily elastically deformable can be implemented through employment of a very simple configuration. Also, control of the follower mechanism section 7 is simplified (for a certain inclination, through application of a force corresponding to the inclination, the follower mechanism section 7 can be caused to follow the inclination).

The present invention is not limited to the above-described embodiment, but may be modified in various other forms without departing from the spirit or scope of the invention.

The invention claimed is:

1. A workpiece vacuum chuck head used to vacuum-chuck a light, minute workpiece and to release and place the vacuum-chucked workpiece on a workpiece placement surface, comprising:
   a base section;
   a workpiece vacuum chuck section; and
   a lower mechanism section for connecting together the base section and the workpiece vacuum chuck section;
   wherein:
   the base section, the workpiece vacuum chuck section, and the follower mechanism section are in the form of an integral structure of a spring-tempered metal;
   the base section has an attachment surface for attaching the workpiece vacuum chuck head to a head drive mechanism;
   the workpiece vacuum chuck section has a workpiece vacuum chuck surface for vacuum-chucking the workpiece, and a negative-pressure chamber provided within the workpiece vacuum chuck section and opening at the workpiece vacuum chuck surface via a suction hole to hold the workpiece on the workpiece vacuum chuck surface; and
   the follower mechanism section has a structure that is easily elastically deformable in three dimensions, so as to cause the workpiece vacuum chuck surface to follow an inclination of the workpiece placement surface.

2. A workpiece vacuum chuck head according to claim 1, wherein:
   a workpiece pusher is accommodated in the negative-pressure chamber, and the workpiece pusher has a pin portion which is inserted into the suction hole and which projects beyond and retracts behind the workpiece vacuum chuck surface.

3. A workpiece vacuum chuck head according to claim 1, wherein:
the follower mechanism section comprises a plurality of curved spring legs, and
the plurality of curved spring legs connect the base section and the workpiece vacuum chuck section at a plurality of corresponding positions and allow the workpiece vacuum chuck surface to be uniformly displaced upon subjection to an external force of any direction that acts on the workpiece vacuum chuck surface.

4. A workpiece vacuum chuck head according to claim 3, wherein:
the base section and the workpiece vacuum chuck section each have a shape of a rectangular quadrilateral as viewed in plane, and
the plurality of curved spring legs connect four corner portions of the base section and corresponding four corner portions of the workpiece vacuum chuck section, respectively.

5. A vacuum chuck head according to claim 1, wherein the workpiece vacuum chuck surface is a surface of the integral structure.

6. A vacuum chuck head according to claim 5, wherein the workpiece vacuum chuck surface is planar.

7. A vacuum chuck head according to claim 1, wherein the workpiece vacuum chuck section is a rectangular quadrilateral block, wherein the workpiece vacuum chuck surface is one surface of the rectangular quadrilateral block.

8. A vacuum chuck head according to claim 1, wherein the workpiece vacuum chuck section follows the inclination of the workpiece placement surface by becoming parallel with the workpiece placement surface.

* * * * *